United States Patent
Beller et al.

(10) Patent No.: US 10,558,689 B2
(45) Date of Patent: Feb. 11, 2020

(54) LEVERAGING CONTEXTUAL INFORMATION IN TOPIC COHERENT QUESTION SEQUENCES

(71) Applicant: INTERNATIONAL BUSINESS MACHINES CORPORATION, Armonk, NY (US)

(72) Inventors: Charles E. Beller, Baltimore, MD (US); Paul J. Chase, Jr., Fairfax, VA (US); Michael Drzewucki, Woodbridge, VA (US); Edward G. Katz, Washington, DC (US); Christopher Phipps, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/814,012

(22) Filed: Nov. 15, 2017

(65) Prior Publication Data
US 2019/0147098 A1    May 16, 2019

(51) Int. Cl.
*G06F 16/332*    (2019.01)
*G10L 15/01*    (2013.01)
(Continued)

(52) U.S. Cl.
CPC .... *G06F 16/3329* (2019.01); *G06F 16/24522* (2019.01); *G06F 16/3334* (2019.01);
(Continued)

(58) Field of Classification Search
CPC .... G06F 17/27; G06F 17/2785; G06F 17/279; G06F 17/2795
See application file for complete search history.

(56) References Cited

U.S. PATENT DOCUMENTS 5,673,369 A       9/1997  Kim
6,131,085 A  *  10/2000  Rossides ............... G06Q 30/02
                                                                  705/1.1
(Continued)

OTHER PUBLICATIONS

Kirschner, Manuel, and Raffaella Bernardi. "Towards an empirically motivated typology of follow-up questions: The role of dialogue context." Proceedings of the 11th Annual Meeting of the Special Interest Group on Discourse and Dialogue. Association for Computational Linguistics, 2010. (Year: 2010).*

(Continued)

*Primary Examiner* — Brian L Albertalli
(74) *Attorney, Agent, or Firm* — Richard A. Wilhelm

(57) ABSTRACT

A method, computer system, and a computer program product for leveraging coherent question sequences is provided. The present invention may include receiving an initiating question. The present invention may include receiving a subsequent question. The present invention may include determining that the received subsequent question is not a rephrasing of the received initiating question. The present invention may also include determining that the received subsequent question is not beginning a new question topic based on determining that the received subsequent question is not a rephrasing of the received initiating question. The present invention may then include propagating a conversational context based on determining that that received subsequent question is not beginning a new question topic. The present invention may include generating and scoring an answer based on the propagated conversational context. The present invention may lastly include outputting the answer.

20 Claims, 6 Drawing Sheets

(51) Int. Cl.
   *G06F 17/27*     (2006.01)
   *G06N 20/00*     (2019.01)
   *G06F 16/33*     (2019.01)
   *G06F 16/2452*   (2019.01)

(52) U.S. Cl.
   CPC ......... *G06F 17/2795* (2013.01); *G06N 20/00* (2019.01); *G10L 15/01* (2013.01)

(56) References Cited

U.S. PATENT DOCUMENTS

| | | | |
|---|---|---|---|
| 6,665,666 | B1 | 12/2003 | Brown et al. |
| 8,204,751 | B1* | 6/2012 | Di Fabbrizio ........ G06F 17/271 704/256 |
| 8,554,540 | B2 | 10/2013 | Lee |
| 8,583,422 | B2 | 11/2013 | Todhunter |
| 8,639,517 | B2 | 1/2014 | Di Fabbrizio et al. |
| 8,819,006 | B1 | 8/2014 | Chechik et al. |
| 8,935,277 | B2 | 1/2015 | Kuchmann-Beauger et al. |
| 9,063,975 | B2 | 6/2015 | Isensee et al. |
| 9,117,194 | B2 | 8/2015 | Liu |
| 9,141,662 | B2 | 9/2015 | Clark et al. |
| 9,430,573 | B2 | 8/2016 | Bailey et al. |
| 9,471,668 | B1 | 10/2016 | Alupului et al. |
| 9,529,793 | B1* | 12/2016 | Taubman ............... G06F 17/274 |
| 9,659,248 | B1* | 5/2017 | Barbosa .............. G06F 17/2785 |
| 10,121,493 | B2* | 11/2018 | Aravamudan .......... G06F 17/30 |
| 2004/0254917 | A1 | 12/2004 | Brill et al. |
| 2006/0282257 | A1* | 12/2006 | Huet ................... G06F 17/2785 704/9 |
| 2010/0278428 | A1* | 11/2010 | Terao ................... G06F 16/345 382/177 |
| 2015/0235131 | A1 | 8/2015 | Allen et al. |
| 2016/0078087 | A1* | 3/2016 | Wang ................ G06F 17/30448 707/706 |
| 2016/0147737 | A1 | 5/2016 | Ryu et al. |
| 2016/0180237 | A1 | 6/2016 | Ahuja et al. |
| 2016/0283581 | A1 | 9/2016 | Berajawala et al. |
| 2016/0300154 | A1 | 10/2016 | Bufe et al. |
| 2016/0350279 | A1 | 12/2016 | Byron et al. |
| 2017/0004204 | A1 | 1/2017 | Bastide et al. |
| 2017/0322939 | A1* | 11/2017 | Byron ................. G06F 17/3053 |
| 2018/0129734 | A1* | 5/2018 | Iwama ............. G06F 17/30684 |
| 2018/0349377 | A1 | 12/2018 | Verma |

OTHER PUBLICATIONS

Bertomeu, Núria, et al. "Contextual phenomena and thematic relations in database QA dialogues: results from a Wizard-of-Oz experiment." Proceedings of the Interactive Question Answering Workshop at HLT-NAACL 2006. Association for Computational Linguistics, 2006. (Year: 2006).*

Borchardt et al., "Knowledge Fusion for Question Answering," MIT CSAIL Research Abstracts, 2007, p. 1-3, http://publications.csail.mit.edu/abstracts/abstracts07/borch-fusion/borch-fusion.html, Accessed on Nov. 13, 2017.

Calais Pedro et al., "An Information Repository Model for Advanced Question Answering Systems," Fourth International Conference on Language Resources and Evaluation (LREC), May 26-28, 2004, p. 985-988, Lisbon, Portugal.

Gruber et al., "Hidden Topic Markov Models," Proceedings of the Eleventh International Conference on Artificial Intelligence and Statistics (PMLR), 2007, 8 Pages.

Gu et al., "A Knowledge-Intensive Method for Conversational CBR," ICCBR 2005: Case-Based Reasoning Research and Development, 2005, p. 296-311, LNAI 3620, Springer-Verlag, Berlin, Heidelberg.

Habibi et al., "Question Answering in Conversations: Query Refinement Using Contextual and Semantic Information," IDIAP Research Report, Jun. 2016, p. 1-34, IDIAP Research Institute.

Hobbs, "From Question-Answering to Information-Seeking Dialogs," SRI International, 2002, p. 1-4.

Kirschner et al., "Analyzing Interactive QA Dialogues Using Logistic Regression Models," AI*IA 2009: Emergent Perspectives in Artificial Intelligence, 2009, p. 334-344, LNAI 5883, Springer-Verlag, Berlin, Heidelberg.

Kramár et al., "Disambiguating Search by Leveraging a Social Context Based on the Stream of User's Activity," UMAP 2010: User Modeling, Adaptation, and Personalization, 2010, p. 387-392, LNCS 6075, Springer-Verlag, Berlin, Heidelberg.

Liu et al., "Automatic Question Answering System Based on Contextual Interaction," Applied Mechanics and Materials, 2011, 1 Page, vols. 58-60, Abstract Only.

Mell et al., "The NIST Definition of Cloud Computing," National Institute of Standards and Technology, Sep. 2011, p. 1-3, Special Publication 800-145.

Sun et al., "Discourse Processing for Context Question Answering Based on Linguistic Knowledge," Knowledge-Based Systems, Aug. 2007, p. 1-23, vol. 20, Issue 6.

* cited by examiner

LEVERAGING CONTEXTUAL INFORMATION IN TOPIC COHERENT QUESTION SEQUENCES

STATEMENT REGARDING FEDERALLY SPONSORED RESEARCH OR DEVELOPMENT

This invention was made with Government support. The Government has certain rights in this invention.

BACKGROUND

The present invention relates generally to the field of computing, and more particularly to deep question answering systems.

Often, a user of a deep question answer system may pose a sequence of questions on a related topic or theme. It may be natural for the user to assume that a question posed in the context of another question will be interpreted with respect to information obtained in the answer to the prior question.

SUMMARY

Embodiments of the present invention disclose a method, computer system, and a computer program product for leveraging coherent question sequences. The present invention may include receiving an initiating question. The present invention may include receiving a subsequent question. The present invention may include determining that the received subsequent question is not a rephrasing of the received initiating question. The present invention may also include determining that the received subsequent question is not beginning a new question topic based on determining that the received subsequent question is not a rephrasing of the received initiating question. The present invention may then include propagating a conversational context based on determining that that received subsequent question is not beginning a new question topic. The present invention may include generating and scoring an answer based on the propagated conversational context. The present invention may lastly include outputting the answer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
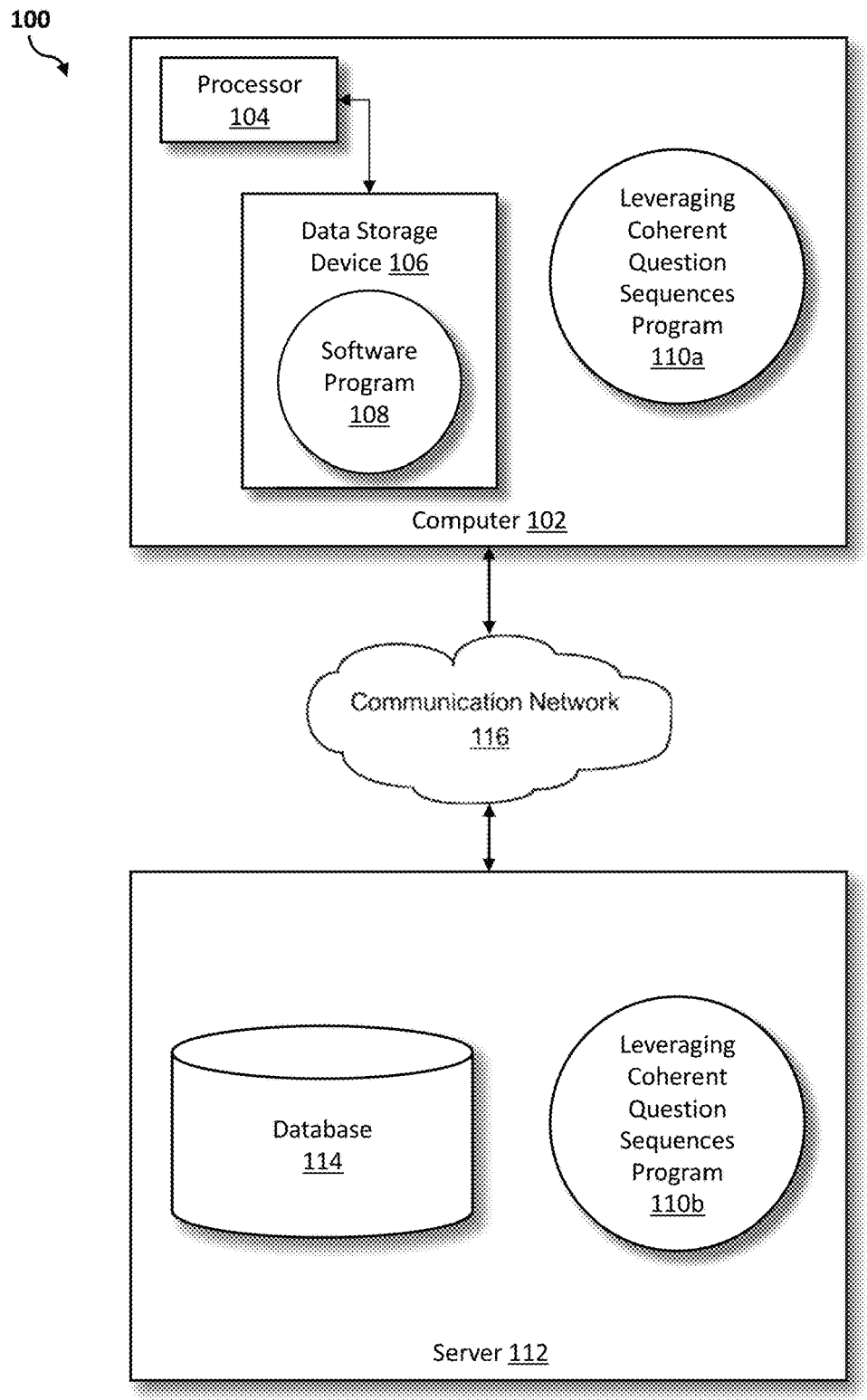
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for leveraging coherent question sequences. As such, the present embodiment has the capacity to improve the technical field of deep question answer systems by considering past questions and answers as context in the determination of answers to future questions. More specifically, a deep question answer system may initialize a question context with topic contextual information drawn from an initiating question. On the input of a subsequent question, the deep question answer system may identify whether the conversational topic sequence is being extended. If a question extends the conversational context, stored context information may be used in the generating of an answer to a subsequent question. If a question does not extend the conversational context, context information may not be propagated and future questions may be answered in the absence of question context information.

As described previously, often, a user of a deep question answer system may pose a sequence of questions on a related topic or theme. It may be natural for the user to assume that a question posed in the context of another question will be interpreted with respect to information obtained in the answer to the prior question. However, existing deep question answer systems may not take context into consideration. This may be problematic, since acceptable, or even correct, answers to a question may differ based on a given context.

Therefore, it may be advantageous to, among other things, incorporate contextual information in topic coherent question sequences to improve answering in a deep question answer system.

According to at least one embodiment, an initiating question may be received. Conversational context may be initialized with topic contextual information drawn from the initiating question.

According to at least one embodiment, on input of a subsequent question, it may be determined that the subsequent question is not a rephrasing of the initial question and that the conversational context information may properly be extended. If a non-rephrasing of the initial question extends the topic-coherent sequence of questions (i.e., if a question which is a non-rephrasing of the prior question is also on the same topic as the initiating question), the conversational context information may be propagated through the question-answer process and answers to the questions posed may be generated and scored based on the propagated context information.

Conversely, according to at least one embodiment, on input of a subsequent question, it may be determined that the subsequent question is a rephrasing of the initial question and that the conversational context information may not properly be extended. If a question is a rephrasing of the initial question, the conversational context information may not be propagated through the question-answer process and answers to the questions posed may be generated in the absence of conversational context information.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a leveraging coherent question sequences program 110a. The networked computer environment 100 may also include a server 112 that is enabled to run a leveraging coherent question sequences program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the leveraging coherent question sequences program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the leveraging coherent question sequences program 110a, 110b (respectively) to determine whether contextual information should be brought to bear, and if so, how to utilize contextual information in a way that will benefit the question answering system. The leveraging coherent question sequences method is explained in more detail below with respect to FIGS. 2A and 2B.

Figure 2A:
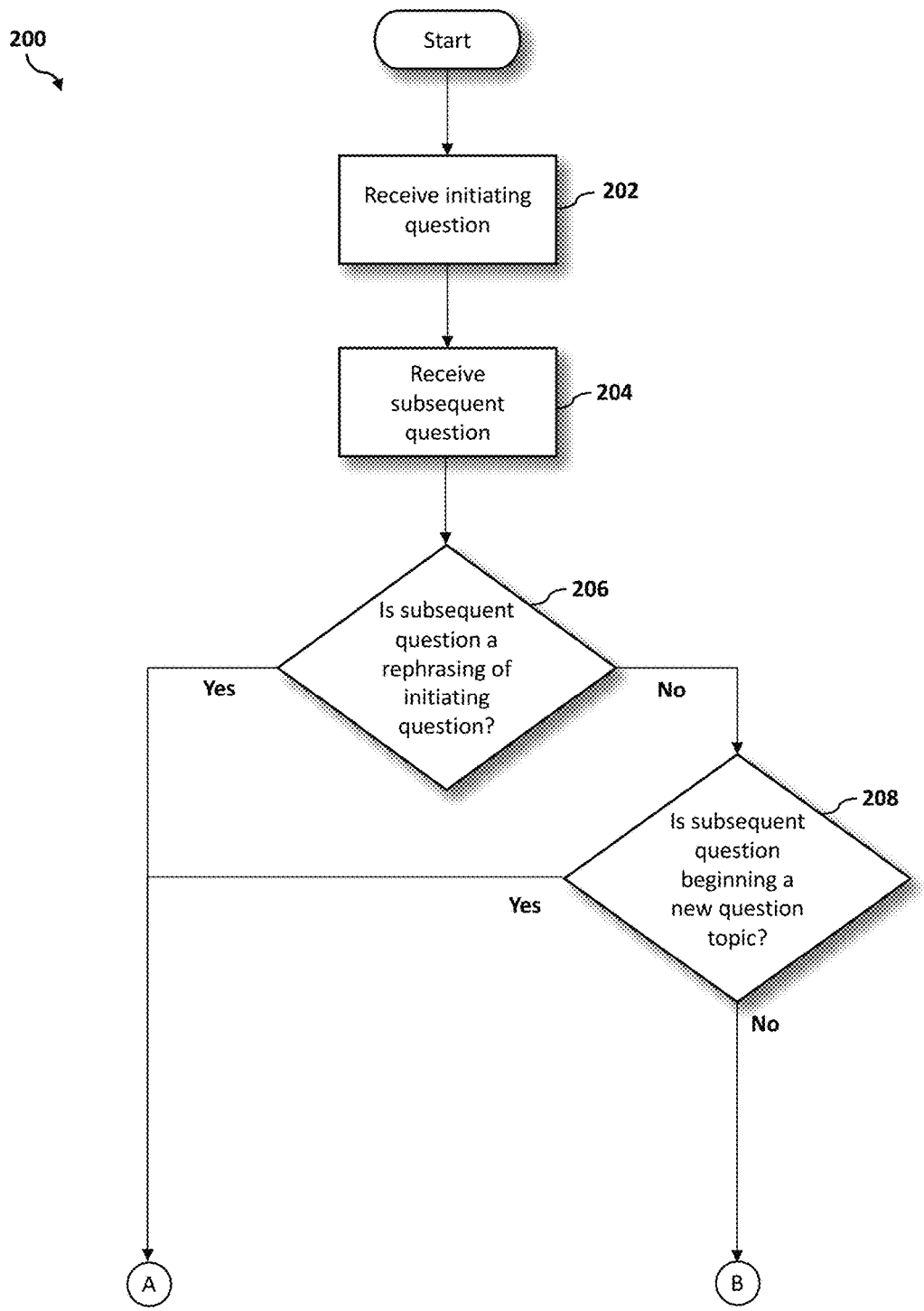
FIGS. 2A and 2B are an operational flowchart illustrating a process for leveraging coherent question sequences according to at least one embodiment.
Figure 2B:
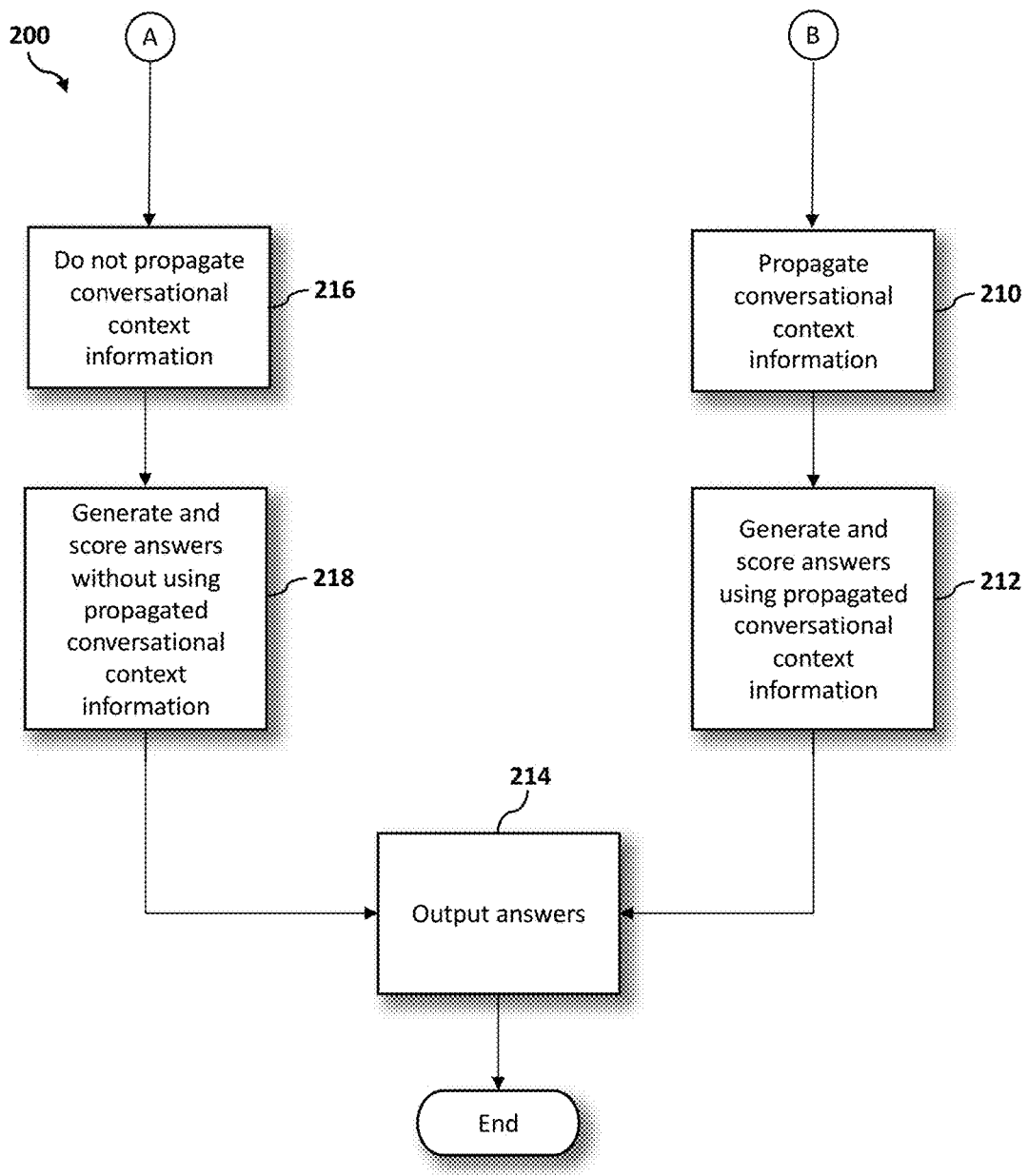

Referring now to FIGS. 2A and 2B, an operational flowchart illustrating the exemplary leveraging coherent question sequences process 200 used by the leveraging coherent question sequences program 110a and 110b according to at least one embodiment is depicted.

At 202, an initiating question is received. The initiating question may be received in a deep question answering system such as IBM's Watson™ (Watson and all Watson-based trademarks are trademarks or registered trademarks of International Business Machines Corporation in the United States, and/or other countries). A question may be spoken and translated into text by the deep question answering system, or may be posed in written text format. The deep question answering system may be a verbal user interface or a written chat user interface. A question may further be interactive, whereby a user may answer a list of questions provided by the deep question answering system.

At 204, a subsequent question is received. The subsequent question may be received in the same manner as the initiating question at 202. If the initiating question was spoken in a verbal user interface, the subsequent question may also be spoken in the verbal user interface. Likewise, if the initiating question was written in text format in a chat user interface, the subsequent question may also be written in text format in the chat user interface. Both the initiating question and the subsequent question may receive an answer at the end of the leveraging coherent question sequences program 110a, 110b.

At 206, it is determined if the subsequent question is a rephrasing of the initial question. The leveraging coherent question sequences program 110a, 110b may determine that the subsequent question is a rephrasing of the initial question by using known methods for synonym detection based on both words and phrases used in the initial and subsequent questions. By utilizing known methods for synonym detection, the leveraging coherent question sequences program 110a, 110b may parse through each word in the initiating and subsequent questions and compare both the words and entities used in each question and the intended meaning of the phrases contained within each question. The initiating and subsequent questions may be compared in their entirety first and then each phrase and word may be compared within them.

For example, where the initiating question and subsequent question are found to contain different words, with one common phrase, the leveraging coherent question sequences program 110a, 110b may determine that the subsequent question is not a rephrasing of the initial question.

Contextual information gathered during an analysis of the initiating question may be stored in a context store, for example, database 114. Contextual information may be complex, with more than one defining aspect and point of focus. Contextual information may include the topic of the initiating question, a grammatical analysis of the initiating question, and a list of entities included in the initiating question, among other things. Contextual information may also include an identification of the user's online persona or spoken voice that asked the initiating question to ensure that the same user is also asking the subsequent question. Further, the timeliness of a subsequent question asked after an initiating question may indicate that the subsequent question was asked by the same user of the leveraging coherent question sequences program 110a, 110b.

If, at 206, it is determined that the subsequent question is not a rephrasing of the initial question, then at 208, it is determined if the subsequent question is beginning a new question topic. By utilizing algorithms that model word document relationships, the leveraging coherent question sequences program 110a, 110b may determine that the initiating question and the subsequent question are concerned with a similar question topic. For example, well-known hidden variable techniques (e.g., hidden Markov models) may be used to analyze words in both the initiating and subsequent questions and to learn and infer whether the questions belong to the same topic. Alternatively, to identify sentence-to-sentence topic coherence relations, the leveraging coherent question sequences program 110a, 110b may determine the level of overlap in the words or semantic annotations of the initiating and subsequent questions, may find the proximity in a lexical resource such as WordNet®, or may find the proximity in a vector-space lexical representation.

If, at 208, it is determined that the subsequent question is not beginning a new question topic, then at 210, conversational context information is propagated. If, as stated previously, it is determined that the subsequent question is not a rephrasing of the initiating question, and the subsequent question is further not commencing a new line of questioning (i.e., a new question topic), the conversational context information stored in the context store may be propagated and utilized in the determination of an answer to the subsequent question. Conversational context information may be propagated to enable the leveraging coherent question sequences program 110a, 110b to generate an answer to the subsequent question that is limited to the topic in which the initiating question was first asked. Limiting the possibility of unrelated answers from being generated by the leveraging coherent question sequences program 110a, 110b may improve the accuracy of the question answering system. For example, if the initiating question is determined to be related to the medical domain, and the subsequent question is also determined to be related to the medical domain, the leveraging coherent question sequences program 110a, 110b may prefer or boost answers to the questions posed that are related to the medical domain topic, and not boost or prefer those that are not. At least one embodiment of the present invention may contain predefined domains, whereby clear reference to medicine, law, etc. may be made.

Information from the context store may be utilized by the leveraging coherent question sequences program 110a, 110b in several ways. For example, semantic annotation from the context store may be used during question analysis to disambiguate the semantic annotation in the subsequent question by filtering out a portion or portions of the subsequent question that is inconsistent or less consistent with that which is stored in the context store. In at least one embodiment of the present invention, the ambiguous annotations may be preserved and the question context may be brought to bear in the answer scoring phase of the question answering process, by ranking more highly answers that are consistent with the context information from the prior question.

If, for example, there are three questions posed to the leveraging coherent question sequences program 110a, 110b, with the first being unrelated to the second and third, which are both related to the same question topic, the second, or subsequent, question, as described previously at 204, may be considered an initiating question, as described previously at 202, and the conversational context information may be propagated, as described previously at 210.

Next, at 212, answers are generated and scored using the propagated conversational context information. A score may be generated by combining many features in a machine learning model, similar to the one used in IBM's Watson Discovery Advisor™ (Watson Discovery Advisor and all Watson Discovery Advisor-based trademarks are trademarks or registered trademarks of International Business Machines Corporation in the United States, and/or other countries). This scoring mechanism may become part of the complex model that ranks generated answers based on the combined features.

If, at 206, it is determined that the subsequent question is a rephrasing of the initial question, then at 216, it is determined that conversational context information should not be propagated. Based on the analysis described previously at 206, the subsequent question may be determined to be a rephrasing of the initial question. Similarly, based on the analysis described previously at 208, the subsequent question may be focused on a different question topic and may be unrelated to the initiating question which was posed by the user of the leveraging coherent question sequences program 110a, 110b. Thus, the conversational context of the initiating question and the subsequent question may not be the same and the answers to both may be unrelated.

At 218, answers are generated and scored without using the propagated conversational context information. As described previously at 212, answers to the initiating and subsequent questions may be generated and scored (i.e., ranked) based on known methods.

At 214, the generated answers are outputted. The generated answers may be outputted in the same manner and format as they were asked. If the initiating and subsequent questions were received verbally, the answers may also be outputted verbally to the user of the leveraging coherent question sequences program 110a, 110b. Likewise, if the initiating and subsequent questions were received in written text format, they may be outputted in the same format. According to another embodiment of the leveraging coherent question sequences program 110a, 110b, the outputted answer may be in a different format than the initiating and subsequent questions. For example, the initiating and subsequent questions may be spoken and the outputted answer may be written in text format in a graphical user interface (GUI).

In an exemplary usage scenario, a user of a question answering system asks a series of two of questions. The first, or initiating, question, as described previously at 202, is the following:

Q1: What is the best wood treatment for plank siding?
A1: Linseed Oil

Thereafter, the user asks a second question, as described previously at 204:

Q2: What is the best treatment for shingles?

When the second question is posed to the system in the context of the first question, contextual topic information drawn from the first question should be brought to bear in the process of answering the second question. The initiating question should initialize the question context with topic contextual information drawn from the initiating question. As described previously at 206, this will involve storing into a context store, available to the second question, words and annotations from the initiating question. The context store may also contain additional analysis such as topic analysis of the question for use in subsequent steps of processing in the leveraging coherent question sequences program 110a, 110b.

On input of the second question, as described previously at 206, the leveraging coherent question sequences program 110a, 110b identifies that the question is not a rephrasing of the initiating question for clarification or disambiguation. The leveraging coherent question sequences program 110a, 110b further identifies that the second question is extending the conversational topic sequence initiated by the initiating question, and is not beginning a new question topic, as described previously at 208, and accordingly propagates the contextual information stored in the context store, as described previously at 210. Information from the context store may be used as part of the answering process. Shingles might, in a neutral context, be associated with both disease and material, while in the context of the semantic annotations gathered based on the initiating question in this instance, material may be more likely to be chosen, and the subsequent question may be answered accordingly.

It may be appreciated that FIGS. 2A and 2B provide only an illustration of one embodiment and do not imply any limitations with regard to how different embodiments may be implemented. Many modifications to the depicted embodiment(s) may be made based on design and implementation requirements.

Figure 3:
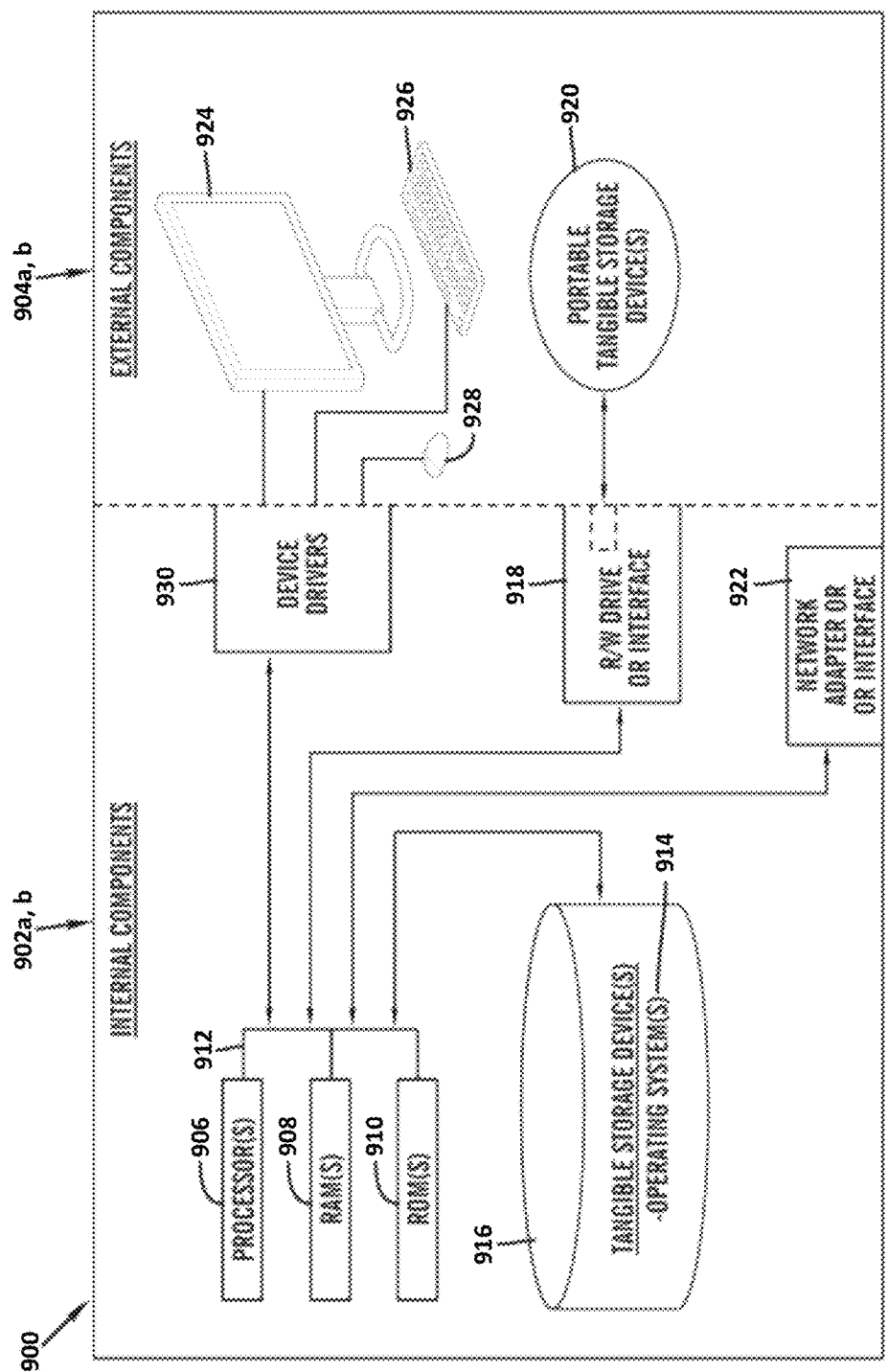
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 3. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the leveraging coherent question sequences program 110*a* in client computer 102, and the leveraging coherent question sequences program 110*b* in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the leveraging coherent question sequences program 110*a* and 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the leveraging coherent question sequences program 110*a* in client computer 102 and the leveraging coherent question sequences program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the leveraging coherent question sequences program 110*a* in client computer 102 and the leveraging coherent question sequences program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
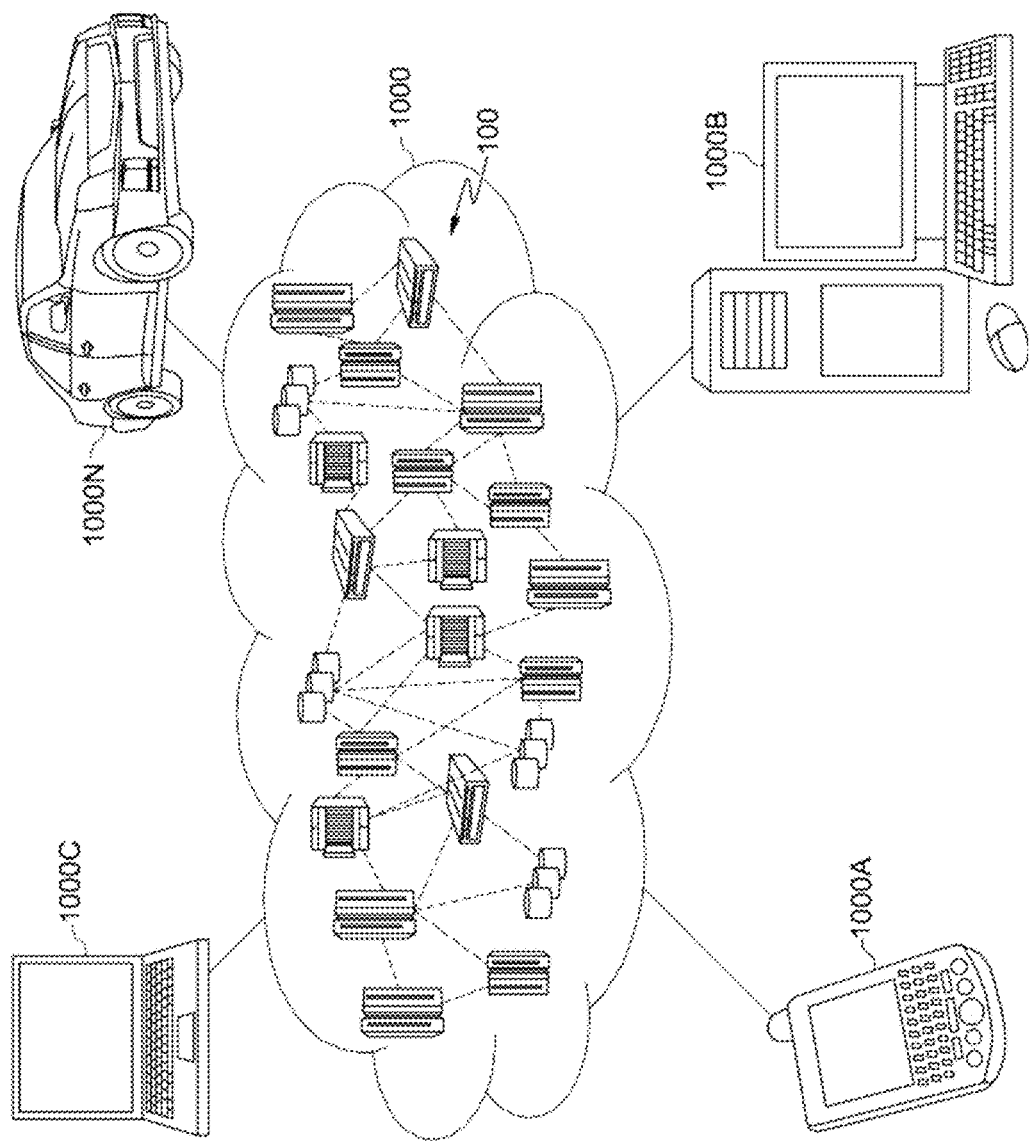
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
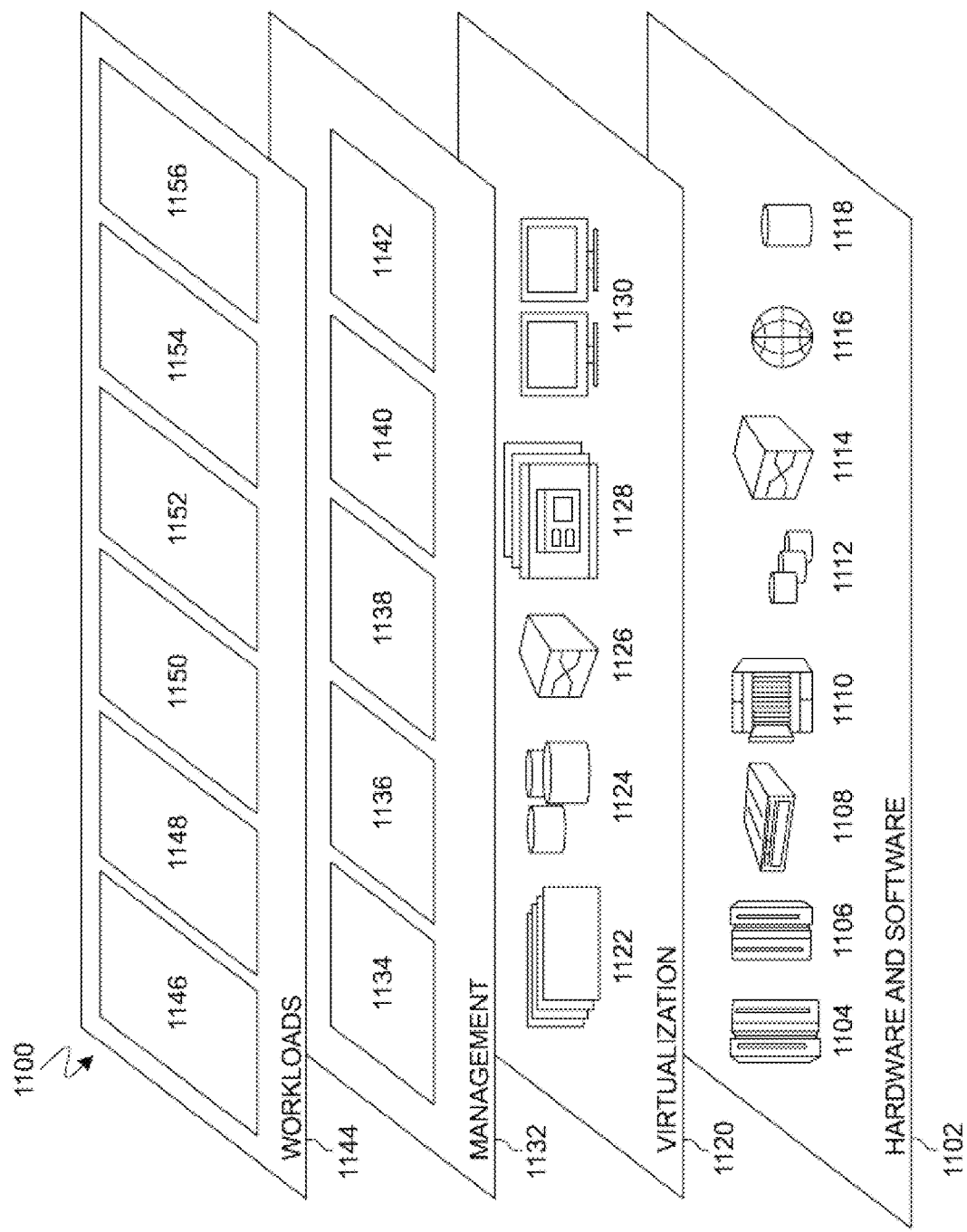
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized.

Examples of workloads and functions which may be provided from this layer include: mapping and navigation 1146; software development and lifecycle management 1148; virtual classroom education delivery 1150; data analytics processing 1152; transaction processing 1154; and leveraging coherent question sequences 1156. A leveraging coherent question sequences program 110a, 110b provides a way to incorporate contextual information in a deep question answering system in order to make the system more accurate in its responses.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for leveraging coherent question sequences, the method comprising:
   receiving an initiating question;
   receiving a subsequent question;
   determining that the received subsequent question is not a rephrasing of the received initiating question;
   determining that the received subsequent question is not beginning a new question topic based on determining that the received subsequent question is not a rephrasing of the received initiating question, by analyzing words in both the received subsequent question and the received initiating question using a hidden variable technique;
   propagating a conversational context based on determining that that received subsequent question is not beginning a new question topic;
   generating and scoring an answer based on the propagated conversational context; and
   outputting the answer.

2. The computer-implemented method of claim 1, wherein the received initiating question and the received subsequent question are in a spoken form or a written form.

3. The computer-implemented method of claim 1, wherein contextual information regarding the received initiating question is stored in a conversational context store.

4. The computer-implemented method of claim 1, wherein determining that the received subsequent question is not the rephrasing of the received initiating question further comprises:
   using a synonym detection algorithm to compare the received initiating question to the received subsequent question.

5. The computer-implemented method of claim 1, wherein determining that the received subsequent question is not beginning the new question topic based on determining that the received subsequent question is not the rephrasing of the received initiating question further comprises:
   analyzing words in both the received subsequent question and the received initiating question using a hidden Markov model.

6. The computer-implemented method of claim 1, wherein propagating the conversational context based on determining that the received subsequent question is not beginning the new question topic comprises utilizing a plurality of information stored within a conversational context store.

7. The computer-implemented method of claim 1, wherein generating and scoring the answer based on the propagated conversational context further comprises:
   combining a plurality of features in a machine learning model.

8. The method of claim 1, wherein the outputted answer is in a spoken form or a written form.

9. A computer system for leveraging coherent question sequences, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving an initiating question;
   receiving a subsequent question;
   determining that the received subsequent question is not a rephrasing of the received initiating question;
   determining that the received subsequent question is not beginning a new question topic based on determining that the received subsequent question is not a rephrasing of the received initiating question, by analyzing words in both the received subsequent question and the received initiating question using a hidden variable technique;
   propagating a conversational context based on determining that that received subsequent question is not beginning a new question topic;
   generating and scoring an answer based on the propagated conversational context; and
   outputting the answer.

10. The computer system of claim 9, wherein the received initiating question and the received subsequent question are in a spoken form or a written form.

11. The computer system of claim 9, wherein contextual information regarding the received initiating question is stored in a conversational context store.

12. The computer system of claim 9, wherein determining that the received subsequent question is not the rephrasing of the received initiating question further comprises:
   using a synonym detection algorithm to compare the received initiating question to the received subsequent question.

13. The computer system of claim 9, wherein determining that the received subsequent question is not beginning the new question topic based on determining that the received subsequent question is not the rephrasing of the received initiating question further comprises:
   analyzing words in both the received subsequent question and the received initiating question using a hidden Markov model.

14. The computer system of claim 9, wherein propagating the conversational context based on determining that the received subsequent question is not beginning the new question topic comprises utilizing a plurality of information stored within a conversational context store.

15. The computer system of claim 9, wherein the outputted answer is in a spoken form or a written form.

16. A computer program product for leveraging coherent question sequences, comprising:

one or more computer-readable storage media and program instructions stored on at least one of the one or more tangible storage media, the program instructions executable by a processor to cause the processor to perform a method comprising: receiving an initiating question;

receiving a subsequent question;

determining that the received subsequent question is not a rephrasing of the received initiating question;

determining that the received subsequent question is not beginning a new question topic based on determining that the received subsequent question is not a rephrasing of the received initiating question, by analyzing words in both the received subsequent question and the received initiating question using a hidden variable technique;

propagating a conversational context based on determining that that received subsequent question is not beginning a new question topic;

generating and scoring an answer based on the propagated conversational context; and outputting the answer.

17. The computer program product of claim 16, wherein the received initiating question and the received subsequent question are in a spoken form or a written form.

18. The computer program product of claim 16, wherein contextual information regarding the received initiating question is stored in a conversational context store.

19. The computer program product of claim 16, wherein determining that the received subsequent question is not the rephrasing of the received initiating question further comprises:

using a synonym detection algorithm to compare the received initiating question to the received subsequent question.

20. The computer program product of claim 16, wherein propagating the conversational context based on determining that the received subsequent question is not beginning the new question topic comprises utilizing a plurality of information stored within a conversational context store.

* * * * *